May 28, 1946.  T. J. LA VALLEY  2,401,085
MEASURING INSTRUMENT
Filed Jan. 20, 1945  2 Sheets-Sheet 1
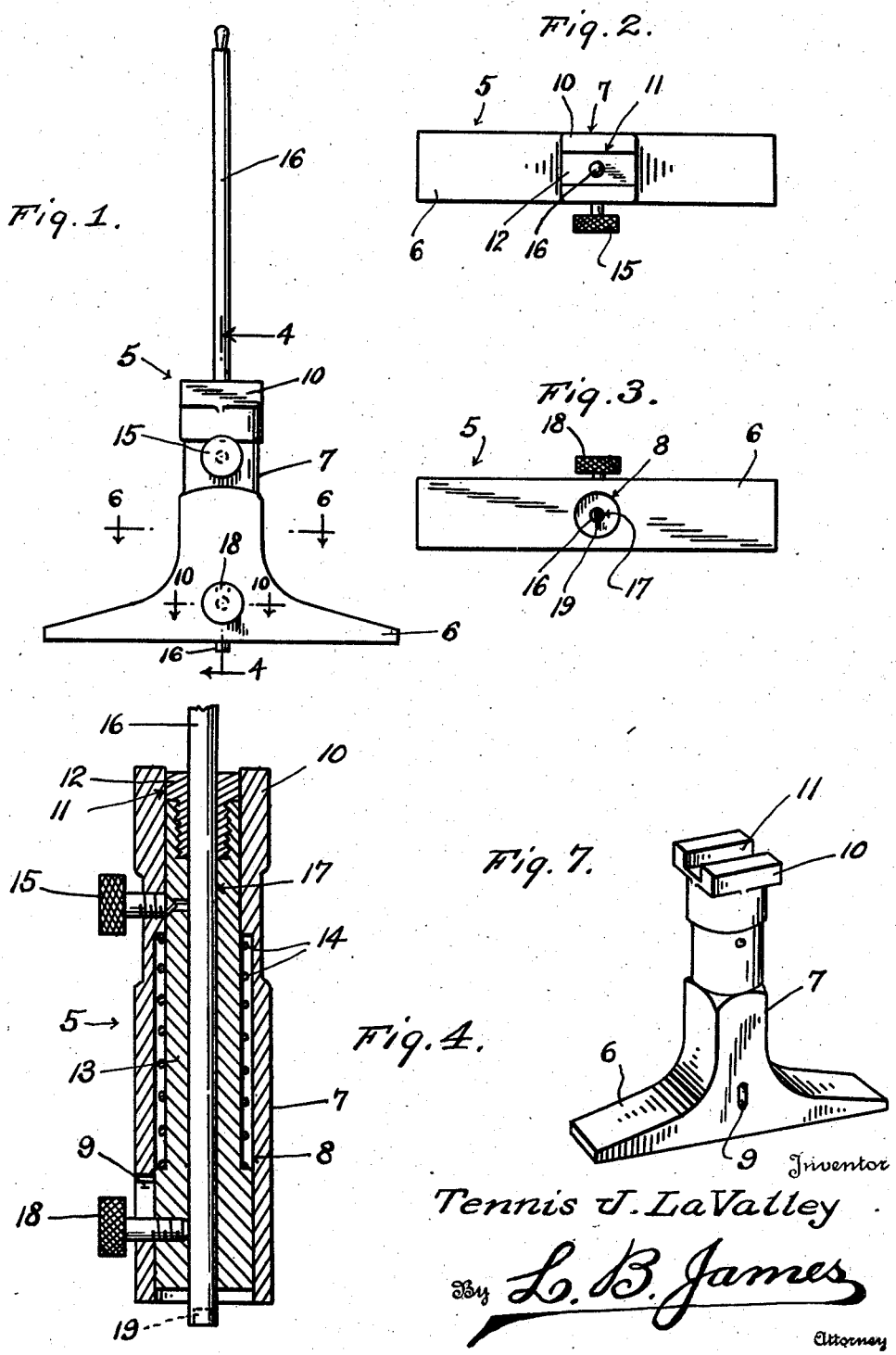
Inventor
Tennis J. LaValley
By L. B. James
Attorney May 28, 1946.　　　T. J. LA VALLEY　　　2,401,085
MEASURING INSTRUMENT
Filed Jan. 20, 1945　　　2 Sheets-Sheet 2

Inventor
Tennis J. LaValley
By L. B. James
Attorney

Patented May 28, 1946

2,401,085

UNITED STATES PATENT OFFICE 2,401,085

MEASURING INSTRUMENT

Tennis J. La Valley, Detroit, Mich.

Application January 20, 1945, Serial No. 573,699

1 Claim. (Cl. 33—169)

This invention relates to measuring instruments, and more particularly a gauge to be used in precision machine work.

One of the objects of this invention resides in the provision of a gauge to be used on the work of lathes, shapers, milling, drilling, grinding, planing, boring and other similar machines and also bench and assembly operations of mechanics.

Another object of this invention resides in the provision of a gauge of such construction that it can be quickly adjusted.

A further object of this invention resides in the provision of a gauge adapted to be used on flat surfaces, checking shoulders, slots, radius holes, counter-bores, counter-sinks, parallel surfaces either flat or round and other similar precision work.

A still further object of this invention resides in the particular construction of the depth rod.

Aside from the aforesaid objects, this invention resides in the particular manner of securing, adjusting and locking the depth rod in the head of the gauge.

With these and other objects in view, this invention resides in certain novel features of construction and arrangement of elements to be hereinafter more particularly set forth in the specification, illustrated in the accompanying drawings and pointed out in the appended claim and, while this disclosure depicts my present conception of the invention, the right is reserved to resort to such changes in construction and arrangement of elements as come within the spirit of the invention.

In the accompanying drawings forming a part of this application:

Fig. 1 is a side view of a measuring instrument constructed in accordance with this invention.

Fig. 2 is a plan view of the instrument.

Fig. 3 is a bottom view thereof.

Fig. 4 is an enlarged vertical sectional view of the measuring instrument taken approximately on line 4—4 Fig. 1.

Fig. 7 is a detail perspective view of the head per se.

Figure 5:
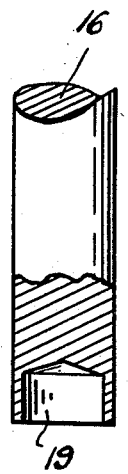
Fig. 5 is an enlarged sectional view through the lower end of the depth rod.
Figure 9:
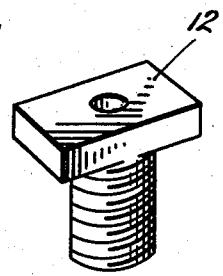
Figure 9 is a detail perspective view of the indicating head.
Figure 6:
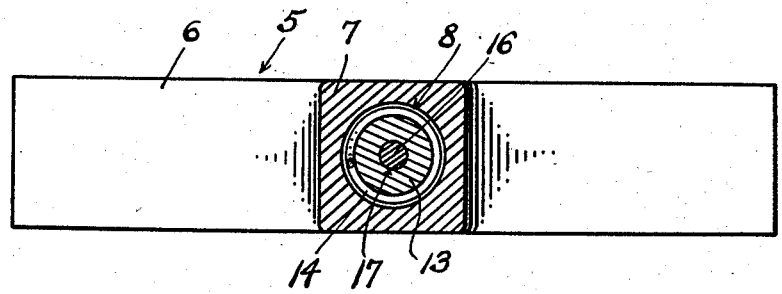
Fig. 6 is a horizontal sectional view taken approximately on line 6—6 of Fig. 1.
Figure 8:
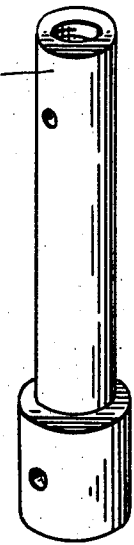
Fig. 8 is a similar view of the slidable plunger per se.
Figure 10:
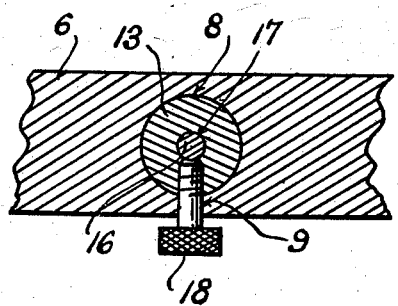
Figure 10 is a section taken on the line 10—10 of Fig. 1.

In the present illustration of this invention, the numeral 5 designates, in general, a measuring gauge constructed of metal or other suitable material and consists of a substantially inverted T-shape head 6 having its stem 7 provided with a longitudinally extending bore 8 in communication with a vertical slot 9 formed in the side wall of the aforesaid stem.

Formed on the upper end of the aforesaid stem 7 is square head 10 having a channel 11 therein to slidably receive an indicating member 12 carried by a sliding plunger 13 disposed in the bore 8 of the head 6 and retained in adjusted position therein against the tension of an expansible coil spring 14 by a thumb screw or the like 15.

The aforesaid depth rod is herein indicated by the numeral 16 and is adjustably disposed in the bore 17 formed in the plunger 13 by a thumb screw 18 which extends through the aforesaid slot 9 with its inner end threaded into a threaded aperture formed in the plunger, thus it will readily be observed that the aforesaid thumb screw not only secures the depth rod in elected positions in the bore of the plunger but also acts to limit the sliding movement thereof within the bore of the T-shape stem of the head 6.

In order that the contact end of the depth rod 16 will procure a true bearing on the surfaces to be measured, especially where uneven spots exist, the same is provided with a bore 19.

With this invention fully described, it is manifest that a measuring gauge is provided which is operable in all classes of precision machine work to produce positive readings in the minimum length of time and, although it can be used with great accuracy as herein disclosed, an indicating instrument can be readily connected therewith in the usual manner practiced in use of similar instruments.

While the present disclosure depicts but one form of my invention, it is understood that rearrangement of the several elements may be resorted to just so the claimed construction is not departed from beyond the spirit of the invention.

Having thus described my invention, what I claim and desire to protect by Letters Patent is:

In a measuring instrument comprising, a substantially inverted T-shape head having a longitudinally extending bore in the stem portion thereof and a slot in the side of the stem communicating with the aforesaid bore, a substantially square shaped head formed on the upper end of the T-shape stem and having a channel therein, a sliding plunger disposed in the bore of the T-shape stem and having a longitudinally extending bore therein communicating with a threaded aperture therein, an expansion coil spring surrounding a certain portion of the aforesaid plunger and exerting a downward thrust thereagainst, an indicating member carried by the upper end of the plunger and slidably disposed in the channel of the head on the T-shape stem, a depth rod disposed in the bore of the plunger with its lower end extending below the lower surface of the T-shape head and its upper end extending outwardly of the indicating member, a thumb-screw passing through the slot in the T-shape stem and threadedly engaged in the aperture in the plunger with its inner end bearing against the depth rod, and a thumb-screw threaded in the T-shape stem and engaging the plunger.

TENNIS J. LA VALLEY.